United States Patent [19]

Leatherman

[11] Patent Number: 4,937,115
[45] Date of Patent: Jun. 26, 1990

[54] BACTERIA IMPERMEABLE, GAS PERMEABLE PACKAGE

[75] Inventor: Dennis D. Leatherman, Pittsburgh, Pa.

[73] Assignee: PPG Industries, Inc., Pittsburgh, Pa.

[21] Appl. No.: 286,579

[22] Filed: Dec. 19, 1988

Related U.S. Application Data

[63] Continuation-in-part of Ser. No. 169,654, Mar. 18, 1988, abandoned, which is a continuation-in-part of Ser. No. 138,980, Dec. 29, 1987, abandoned.

[51] Int. Cl.$^5$ .................... B32B 3/26; B65D 30/02
[52] U.S. Cl. .................... 428/36.4; 428/315.5; 428/317.9; 428/319.9; 428/461; 428/483; 428/516; 428/518; 521/63
[58] Field of Search ............ 428/315.5, 317.9, 319.9, 428/347, 516, 518, 458, 461, 483, 36.4; 521/63, 64; 206/439

[56] References Cited

U.S. PATENT DOCUMENTS

| | | | |
|---|---|---|---|
| 3,351,495 | 11/1967 | Larsen et al. | 136/146 |
| 3,745,057 | 7/1973 | Loft et al. | 161/159 |
| 3,819,106 | 6/1974 | Schuster | 229/62 |
| 4,063,383 | 12/1977 | Green | 47/1.1 |
| 4,539,256 | 9/1985 | Shipman | 428/315.5 |
| 4,681,750 | 7/1987 | Johnson et al. | 423/339 |
| 4,734,196 | 3/1988 | Kono et al. | 521/64 |

FOREIGN PATENT DOCUMENTS 2169129 7/1986 United Kingdom.

Primary Examiner—James Seidleck
Attorney, Agent, or Firm—George D. Morris

[57] ABSTRACT

A sterilizable or sterilized package comprises at least one microporous member comprising a matrix consisting essentially of linear ultrahigh molecular weight polyolefin, a large proportion of finely divided water-insouble siliceous filler, and interconnecting pores.

16 Claims, No Drawings

BACTERIA IMPERMEABLE, GAS PERMEABLE PACKAGE

CROSS REFERENCE TO RELATED APPLICATION

This is a continuation-in-part of application Ser. No. 169,654, filed Mar. 18, 1988, which is a continuation-in-part of application Ser. No. 138,980, filed Dec. 29, 1987, both abandoned.

BACKGROUND OF THE INVENTION

Packages which, when sealed, permit gas to pass back and forth between the interior and exterior of the package yet are impermeable to the passage of bacteria, are used in a wide variety of ways for many purposes. Typically, all or a portion of such a package is constructed of a microporous member which permits passage of gas but not bacteria.

According to one variation, the package is either sealed and then sterilized or sterilized and then sealed under sterile conditions. Such sealed, sterilized packages are particularly useful for the collection of biological, marine, agricultural, and other samples for later analysis at a location remote from the collection site. This is accomplished by opening the sterilized package, inserting the sample, and immediately resealing the package in a manner as will preclude the entry of foreign matter which would introduce unknown qualitative and quantitative variables into the subsequent analysis. The object is to preserve the sample in a condition in which its subsequent laboratory analysis will be meaningful insofar as ascertaining accurately its state at the time of collection. Thus, if the sample was originally bacteria-free, the object is to preserve it in a bacteria-free condition. If the original sample contains bacteria, the object is to prevent contamination with other bacteria. See U.S. Pat. No. 3,819,106, the entire disclosure of which is incorporated herein by reference.

In another variation, nutrient material such as for example soil, grain, agar-agar culture medium, or gelatin culture medium, is placed in a package and the unsealed package and its contents are sterilized. Following sterilization the nutrient medium is inoculated with one or more bacteria or one or more fungi (e.g., mushroom mycelium) and the package is sealed under conditions such that contamination with foreign bacteria is avoided. The package is then stored under incubation conditions for growth of the inoculating organism or organisms. During incubation, the package excludes foreign bacteria, but permits gases such as oxygen, carbon dioxide, and water vapor to pass through the package. In a modification of this variation, nutrient material is placed in the package and then the package is sealed and sterilized. After sterilization the package is opened, inoculated with the desired organism or organisms, and resealed. Inoculation and resealing are accomplished under conditions such that contamination by foreign bacteria is avoided. Storage under incubation conditions then proceeds as earlier described. See U.S. Pat. No. 4,063,383, the entire disclosure of which is incorporated herein by reference.

Perhaps the most frequent use of packages of this type is the packaging of medial items such as scalpels, forceps, clamps, syringes, hypodermic needles, catheters, prostheses, pins, suture materials, gauze, dressings, bandages, sponges, and the like, although various other items may be so packaged. Hardware for inclusion in interplanetary probes would be an example of the latter category of items.

In one variation, the package is sterilized, the sterilized item is placed in the package, and the package is sealed. Placement in the package and sealing are accomplished under conditions that prevent contamination from foreign bacteria.

In another variation, the item to be protected from bacteria is placed in the package and then the package is sealed, and sterilized. Such sealed, sterilized packages can be stored for substantial periods of time while the contents are maintained in a bacteria-free condition. Sterilization is most often performed by either the packager who is frequently the manufacturer of the item, or by the user of the item such as a hospital or clinic.

The principle upon which all of the above uses are based is that the package, when sealed and sterilized in a sterilizing environment before or after sealing, maintains the interior of the package in a bacteria-free condition after removal of the package from the sterilizing environment.

The impermeability to the passage of bacteria and the permeability to the passage of gases between the interior and exterior are characteristics of the sealed package which permit a wider variety of uses and sterilization processes than would be the case if such characteristics were not present.

The three methods of sterilization most commonly used are steam autoclaving, exposure to ethylene oxide gas, and exposure to ionizing radiation such as gamma radiation. As indicated in U.S. Pat. No. 4,352,429, the entire disclosure of which is incorporated herein by reference, the choice of materials is largely dependent on the method of sterilization to which the package will be subjected.

THE INVENTION

It has now been found that when the package comprises at least one microporous member comprising essentially linear ultrahigh molecular weight polyolefin and a large proportion of water-insoluble siliceous filler, the package may be effectively sterilized in a wide range of sterilizing environments, including sterilization by steam autoclaving, exposure to ethylene oxide gas, and exposure to ionizing radiation such as gamma radiation.

Accordingly, in a package, which when sealed and sterilized in a sterilizing environment before or after sealing maintains the interior of the package in a bacteria-free condition after removal of the package from the sterilizing environment, the package comprising at least one unstretched microporous member which is impermeable to the passage of bacteria and which is permeable to the passage of gases between the exterior and interior of the package, the invention is the improvement wherein the microporous member comprises: (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble siliceous filler distributed throughout the matrix, the filler constituting from about 50 percent to about 90 percent by weight of the microporous member, and (c)

a network of interconnecting pores communicating throughout the microporous material substrate, the pores constituting from about 35 to about 80 percent by volume of the microporous member.

Although it is not desired to be bound by any theory, the presence of the finely divided particulate substantially water-insoluble siliceous filler seems to permit ethylene oxide and water vapor to penetrate the member very rapidly.

Most often the microporous material from which the microporous member is made is in the form of a sheet, film, or tube. The thickness across the microporous material may vary widely, but usually it is in the range of from about 0.03 to about 0.65 millimeter. In many cases it is in the range of from about 0.07 to about 0.51 millimeter. From about 0.18 to about 0.51 millimeter is preferred.

Inasmuch as ultrahigh molecular weight (UHMW) polyolefin is not a thermoset polymer having an infinite molecular weight, it is technically classified as a thermoplastic. However, because the molecules are essentially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of the microporous material.

As indicated earlier, the intrinsic viscosity of the UHMW polyethylene is at least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 18 and 39 deciliters/gram. An intrinsic viscosity in the range of from about 18 to about 32 deciliters/gram is preferred.

Also as indicated earlier the intrinsic viscosity of the UHMW polypropylene is at least about 6 deciliters/gram. In many cases the intrinsic viscosity is at least about 7 deciliters/gram. Although there is no particular restriction on the upper limit of the intrinsic viscosity, the intrinsic viscosity is often in the range of from about 6 to about 18 deciliters/gram. An intrinsic viscosity in the range of from about 7 to about 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

The nominal molecular weight of UHMW polyethylene is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 [\eta]^{1.25}$$

where M is the nominal molecular weight and $[\eta]$ is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacicity of such polymer is at least about 95 percent, while preferably it is at least about 98 percent.

Sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, or the like. It is our experience that usually at least about 50 percent UHMW polyolefin, based on the weight of the matrix, will provide the desired properties to the microporous material. In most cases, however, it is preferred that the other thermoplastic organic polymer be substantially absent.

The finely divided substantially water-insoluble siliceous filler used in the present invention is particulate. As present in the microporous material, the filler may be in the form of ultimate particles, aggregates of ultimate particles, or a combination of both. In most cases, at least about 90 percent by weight of the filler used in preparing the microporous material has gross particle sizes in the range of from about 5 to about 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least about 90 percent by weight of the filler has gross particle sizes in the range of from about 10 to about 30 micrometers. It is expected that the sizes of filler agglomerates will be reduced during processing of the ingredients to prepare the microporous material. Accordingly, the distribution of gross particle sizes in the microporous material may be smaller than in the raw filler itself. ASTM C 690-80 is, in its entirety, incorporated herein by reference.

Examples of suitable siliceous fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Example of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate.

Silica and the clays are the preferred siliceous fillers. Of the silicas, precipitated silica, silica gel, or fumed silica is most often used.

The particularly preferred finely divided particulate substantially water-insoluble siliceous filler is precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144, the entire disclosure of which is incorporate herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acid may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in U.S. Pat. No. 2,940,830, in U.S. Pat. No. 4,681,750, and in West German Offenlegungsschrift 35 45 615, the entire disclosures of which are incorporated herein by reference, including especially the processes for making precipitated silicas and the properties of the products.

In the case of the preferred filler, precipitated silica, the average ultimate particle size (irrespective of whether or not the ultimate particles are agglomerated) is less than about 0.1 micrometer as determined by transmission electron microscopy. Often the average ultimate particle size is less than about 0.05 micrometer. Preferably the average ultimate particle size of the precipitated silica is less than about 0.03 micrometer.

The finely divided particulate substantially water-insoluble siliceous filler constitutes from about 50 to 90 percent by weight of the microporous material. Frequently such filler constitutes from about 50 to about 85 percent by weight of the microporous material. From about 60 percent to about 80 percent by weight is preferred.

Minor amounts, usually less than about 5 percent by weight, of other materials used in processing such as lubricant, processing plasticizer, organic extraction liquid, surfactant, water, and the like, may optionally also be present. Yet other materials introduced for particular purposes may optionally be present in the microporous material in small amounts, usually less than about 15 percent by weight. Examples of such materials include antioxidants, ultraviolet light absorbers, flame retardants, reinforcing fibers such as chopped glass fiber strand, dyes, pigments, and the like. The balance of the microporous material, exclusive of filler and any impregnant applied for one or more special purposes is essentially the thermoplastic organic polymer.

On an impregnant-free basis, pores constitute at least about 35 percent by volume of the microporous material. In many instances the pores constitute at least about 60 percent by volume of the microporous material. Often the pores constitute from at least about 35 percent to about 95 percent by volume of the microporous material. From about 60 percent to about 75 percent by volume is preferred. As used herein and in the claims, the porosity (also known as void volume) of the microporous material, expressed as percent by volume, is determined according to the equation:

$$Porosity = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left(\frac{v_1 r_1}{w_1} + \frac{v_2 r_2}{w_2}\right) \Big/ \left(\frac{v_1}{w_1} + \frac{v_2}{w_2}\right)$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally the volume average diameter of the pores is in the range of from about 0.02 to about 50 micrometers. Very often the volume average diameter of the pores is in the range of from about 0.04 to about 40 micrometers. From about 0.05 to about 30 micrometers is preferred.

In the course of determining the volume average pore diameter of the above procedure, the maximum pore radius detected is sometimes noted. This is taken from the low pressure range scan if run; otherwise it is taken from the high pressure range scan. The maximum pore diameter is twice the maximum pore radius.

Microporous material may be produced according to the general principles and procedures of U.S. Pat. No. 3,351,495, the entire disclosure of which is incorporated herein by reference, including especially the processes for making microporous materials and the properties of the products.

Preferably filler, thermoplastic organic polymer powder, processing plasticizer and minor amounts of lubricant and antioxidant are mixed until a substantially uniform mixture is obtained. The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are those oils which have a pour point of less than 22° C. according to ASTM D 97-66 (reapproved 1978). Particularly preferred are oils having a pour point of less than 10° C. Examples of suitable oils include Shellflex® 412 and Shellflex® 371 oil (Shell Oil Co.) which are solvent refined and hydrotreated oils derived from naphthenic crude. ASTM D 2226-82 and ASTM D 97-66 (reapproved 1978) are, in the entireties, incorporated herein by reference. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1-2-trichloro-1,2,2-trifluoroethane, isopropyl alcohol, diethyl ether and acetone.

In the above described process for producing microporous material, extrusion and calendering are facilitated when the substantially water-insoluble filler carries much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of the filler itself is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to 350 square meters per gram. ASTM C 819-77 is, in its entirety, incorporated herein by reference.

Inasmuch as it is desirable to essentially retain the filler in the microporous material, it is preferred that the substantially water-insoluble filler be substantially insoluble in the processing plasticizer and substantially insoluble in the organic extraction liquid when microporous material is produced by the above process.

The residual processing plasticizer content is usually less than 5 percent by weight of the microporous sheet and this may be reduced even further by additional extractions using the same or a different organic extraction liquid.

Pores constitute from about 35 to about 80 percent by volume of the microporous material when made by the above-described process. In many cases the pores constitute from about 60 to about 75 percent by volume of the microporous material.

The volume average diameter of the pores of the microporous material when made by the above-described process, is usually in the range of from about 0.02 to about 0.5 micrometers. Frequently the average diameter of the pores is in the range of from about 0.04 to about 0.3 micrometers. From about 0.05 to about 0.25 micrometers is preferred.

The microporous material produced by the above-described process may be used for producing packages which, when sealed, are bacteria impermeable and gas permeable.

The microporous material may be printed with a wide variety of printing inks using a wide variety of printing processes. Both the printing inks and the printing processes are themselves conventional. Printing may be accomplished before fabrication of the microporous material into microporous members for packages, after such fabrication, or after assembly of the package.

There are many advantages in using the microporous material described herein as a printing substrate.

One such advantage is that the substrate need not be pretreated with any of the pretreatments customarily used to improve adhesion between the printing ink and polyolefin substrate such as flame treatment, chlorination, or especially corona discharge treatment which is most commonly employed. This is surprising inasmuch as untreated polyolefins such as polyethylene and polypropylene cannot ordinarily be successfully printed because of a lack of adhesion between the polyolefin printing ink and the polyolefin substrate. The microporous material substrates used in the present invention may be pretreated to further improve ink-substrate adhesion, but commercially satisfactory results can ordinarily be attained without employing such methods.

Another advantage is that the microporous material substrates accept a wide variety of printing inks, including most organic solvent-based inks which are incompatible with water, organic solvent-based inks which are compatible with water, and water-based inks.

Yet another advantage is very rapid drying of most inks to the tack-free state upon printing the microporous material substrates. This advantage is quite important in high speed press runs, in multicolor printing, and in reducing or even eliminating blocking of stacks or coils of the printed substrate.

A further advantage is the sharpness of the printed image that can be attained. This is especially important in graphic arts applications where fine lines, detailed drawings, or halftone images are to be printed. Halftone images printed on the microporous material substrates ordinarily exhibit high degrees of dot resolution.

Ink jet printing, especially when a water-based ink jet printing ink is used, is particularly suitable for printing bar codes on microporous material substrates. The resulting bars are sharp and of high resolution, which are important factors in reducing errors when the codes are read by conventional methods and equipment. The ink dries very rapidly when applied, thereby minimizing loss of bar resolution due to smearing in subsequent handling operations.

Printing processes, printing equipment, and printing inks have been extensively discussed and documented. Examples of reference works that may be consulted include L. M. Larsen, *Industrial Printing Ink*, Reinhold Publishing Corp., (1962); Kirk-Othmer, *Encyclopedia of Chemical Technology*, 2d Ed., John Wiley & Sons, Inc., Vol. 11, pages 611-632 (1966) and Vol. 16, pages 494-546 (1968); and R. N. Blair, *The Lithographers Manual*, The Graphic Arts Technical Foundation, Inc., 7th Ed. (1983).

For a more detailed description of printing on microporous material of the kind employed in the present invention, see U.S. Pat. No. 4,861,644, the entire disclosure of which is incorporated herein by reference.

The package should be constructed such that (1) it comprises at least one microporous member of the type described above, (2) the microporous member, which is impermeable to the passage of bacteria, is permeable to the passage of gases between the exterior and interior of the package, and (3) when the package is sealed, there is no passage of bacteria between the exterior and interior of the package. Otherwise, the precise structural details are of secondary importance and may be widely varied.

There are many known packages which may be modified by replacing some or all of the microporous member of the known packages with the microporous member described herein. Examples of such known packages and their materials and modes of construction are shown in the following United States Pat. Nos.: 3,247,957; 3,338,019; 3,472,369; 3,547,257; 3,627,611; 3,685,720; 3,745,057; 3,754,700; 3,761,013; 3,819,106; 3,938,658; 3,939,971; 4,042,170; 4,063,383; 4,194,622; 4,276,982; 4,311,477; 4,352,429; 4,367,816; 4,402,453; and 4,660,721. The disclosures of the foregoing United States Patents are, in their entireties, incorporated herein by reference.

The package of the present invention may be constructed entirely of the microporous member(s) described herein, or as is more usually the case, it may be constructed of the microporous member(s) and at least one other material. The other material is usually impervious to the passage of gas and bacteria, although it may be a microporous material other than the microporous member(s) described herein. Examples of other materials which are impervious to the passage of gas and bacteria include polyethylene, polypropylene, poly(vinyl chloride), saran, poly(ethylene terephthalate), and aluminized poly(ethylene terephthalate), usually in the form of film or sheet, and aluminum foil. Examples of other microporous materials include surgical grade kraft paper, spun bonded polyethylene, spun bonded polypropylene, microporous polyethylene, and microporous polypropylene, also usually in the form of film or sheet.

Seams, joints, seals, and the like may be made by conventional techniques such as for example heat sealing and adhesive bonding. Examples of heat sealing include sealing through use of heated rollers, sealing through use of heated bars, radio frequency (RF) sealing, and ultrasonic sealing. Peelable seals based on pressure sensitive adhesives may be used for flaps or strips which are to be peeled away to gain access to the interior of the previously sealed package.

The invention is further described in conjunction with the following examples which are to be considered illustrative rather than limiting.

EXAMPLES

Microporous Material Formation

The preparation of the above described materials is illustrated by the following descriptive examples. Processing oil was used as the processing plasticizer. Silica, polymer, lubricant and antioxidant in the amount specified in Table I were placed in a high intensity mixer and mixed at high speed for 30 seconds to thoroughly blend the dry ingredients. The processing oil needed to formulate the batch was pumped into the mixer over a period of 2–3 minutes with low speed agitation. After the completion of the processing oil addition a 2 minute low speed mix period was used to distribute the processing oil uniformly throughout the mixture.

TABLE I

| Ingredient | Formulations Example No. | | | | | | | | |
|---|---|---|---|---|---|---|---|---|---|
| | 1 | 2 | 3 | 4 | 5 | 6 | 7 | 8 | 9 |
| UHMWPE (1), kg | 5.67 | 9.98 | 4.25 | 8.57 | 6.12 | 9.98 | 3.49 | 5.73 | 11.84 |
| Polypropylene (2), kg | 0 | 0 | 1.42 | 0 | 0 | 0 | 0 | 0 | 0 |
| Precipitated Silica (3), kg | 19.96 | 19.96 | 19.96 | 19.96 | 13.02 | 9.98 | 19.96 | 20.17 | 20.87 |
| Silica Gel, kg | 0 | 0 | 0 | 0 | 6.49 | 0 | 0 | 0 | 0 |
| Clay, kg | 0 | 0 | 0 | 9.98 | 0 | 0 | 0 | 0 | 0 |
| Lubricant (4), g | 100 | 100 | 100 | 100 | 100 | 50 | 100 | 100 | 100 |
| Antioxidant (5), g | 100 | 100 | 100 | 100 | 100 | 50 | 100 | 100 | 100 |
| Processing Oil (6), kg | | | | | | | | | |
| in Batch | 31.21 | 31.21 | 31.21 | 37.58 | 33.44 | 16.89 | 31.72 | 31.29 | 34.13 |
| at Extruder | 13.61 | 41.59 | 30.39 | 28.60 | ~14 | 18.72 | 13.61 | ~10.96 | ~51.93 |

(1) UHMWPE = Ultrahigh Molecular Weight Polyethylene, Himont 1900, Himont, U.S.A., Inc.
(2) Profax ® 6801, Himont U.S.A., Inc.
(3) HiSil ® SBG, PPG Industries, Inc.
(4) Petrac ® CZ81, Desoto, Inc., Chemical Speciality Division
(5) Irganox ® B-215, Ciba-Geigy Corp.
(6) Shellflex ® 412, Shell Chemical Co.

The batch was then conveyed to a ribbon blender where usually it was mixed with up to two additional batches of the same composition. Material was fed from the ribbon blender to a twin screw extruder by a variable rate screw feeder. Additional processing oil was added via a metering pump into the feed throat of the extruder. The extruder mixed and melted the formulation and extruded it through a 76.2 centimeter×0.3175 centimeter slot die. The extruded sheet was then calendered. A description of one type of calender that may be used may be found in the U.S. Pat. No. 4,734,229, the entire disclosure of which is incorporated herein by reference, including the structures of the devices and their modes of operation. Other calenders of different design may alternatively be used; such calenders and their modes of operation are well known in the art. The hot, calendered sheet was then passed around a chill roll to cool the sheet. The rough edges of the cooled calendered sheet were trimmed by rotary knives to the desired width.

The oil filled sheet was conveyed to the extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of 65–88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of extractors may be found in European Patent Application Publication No. EP 0 191 615, the entire disclosure of which is incorporated herein by reference, including especially the structures of the devices and their modes of operation. The sheet was dried by radiant heat and convective air flow. The dried sheet was wound on cores to provide roll stock for further processing.

The microporous sheets, as well as the hereinafter described biaxially stretched microporous sheets produced therefrom, were tested for various physical properties. Table II identifies the properties with the methods used for their determination. The various ASTM test methods and Method 502 C, referenced in Table II, are, in their entireties, incorporated herein by reference.

The results of physical testing of the unstretched microporous sheets are shown in Table III.

Property values indicated by MD (machine direction) were obtained on samples whose major axis was oriented along the length of the sheet. TD (transverse direction; cross machine direction) properties were obtained from samples whose major axis was oriented across the sheet.

TABLE II

| Property | Physical Test Methods Test Method |
|---|---|
| Tensile Strength | ASTM D 412-83. |
| Elongation | |
| Porosity | As described in the text above. |
| Matrix Tensile Strength | Tensile Strength determined in accordance with ASTM D 412-83 multiplied by the quantity 100/(100-Porosity). |
| Tear Strength, Die C | ASTM D 624-81. |
| Processing Oil Content | Method 502 C in "Standard Methods for the Examination of Water and Wastewater", 14th Ed., APHA-AWWA-WPCF (1975). |
| Maximum Pore Diameter | Mercury Porosimetry, as described in the text above. |
| Volume Average Pore Diameter | Mercury Porosimetry, as described in the text above. |
| Gurley Air Flow | ASTM D 726-58 (reapproved 1971), Method A. |
| Mullens Hydrostatic | ASTM D 751-79, Sec. 30-34, Method A. |

TABLE II-continued

Physical Test Methods

| Property | Test Method |
|---|---|
| Resistance | |
| MVTR (Moisture Vapor Transmission Rate) | ASTM E 96-80. |
| Methanol Bubble Pressure | ASTM F 316-80, using methanol. |
| Maximum Limiting Pore Diameter | ASTM F 316-80, using methanol where $c\gamma = 22.34$ $(\mu m)(kPa)$. |
| Heat Shrinkage | ASTM D 1204-84, using 15.24 cm × 20.32 cm sample, 1 hr at 100° C. |
| Strip Tensile Strength and Elongation | ASTM D 828-60. |
| Breaking Factor and Elongation | ASTM D 882-83. |

TABLE III

Physical Properties of Microporous Sheet

| | Example No. | | | | | | | | |
|---|---|---|---|---|---|---|---|---|---|
| | 1 | 2 | 3 | 4 | 5 | 6 | 7 | 8 | 9 |
| Thickness, mm | 0.229 | 0.279 | 0.229 | 0.381 | 0.483 | 0.254 | 0.229 | 0.356 | 0.305 |
| Matrix Tensile Strength, MPa | | | | | | | | | |
| MD | 23.82 | 34.33 | 25.66 | 27.79 | 29.21 | 70.47 | 20.35 | 31.90 | 51.37 |
| TD | 9.94 | 14.91 | 10.38 | 19.05 | 15.55 | 26.39 | 5.97 | 15.82 | 21.25 |
| Elongation at break, % | | | | | | | | | |
| MD | 250 | 279 | 227 | | | 14 | 110 | 264 | |
| TD | 108 | 140 | 112 | 546 | 470 | 482 | 214 | 466 | |
| Tear Strength, kN/m | | | | | | | | | |
| MD | 36.25 | 61.47 | 47.81 | 56.39 | 57.09 | 93.34 | 24.52 | 53.06 | 87.04 |
| TD | 18.04 | 39.93 | 23.12 | 39.75 | 32.22 | 89.66 | 7.36 | 32.57 | 56.39 |
| Porosity, vol % | 71 | 66 | 68 | 57.9 | 59.3 | 58.9 | 77 | 66 | 66.9 |
| Processing Oil Content, wt % | 4.1 | 2.7 | 2.4 | | | | 2.7 | 2.4 | |
| Maximum Pore Diameter, $\mu m$ | 0.86 | 0.30 | 0.28 | 1.34 | 6.11 | 0.16 | | | |
| Volume Average Pore Diameter, $\mu m$ | 0.11 | 0.065 | 0.069 | 0.099 | 0.111 | 0.12 | | | |
| Gurley Air Flow, sec/100 cc | 904 | 1711 | 955 | | | 4098 | 422 | 1757 | 1792 |

MICROPOROUS MATERIAL SUBSTRATE FORMATION

Larger batch mixing equipment was employed than was used for Examples 1-9. Processing oil was used as the processing plasticizer. Silica, polymer, lubricant, and antioxidant in the amounts specified in Table IV were placed in a high intensity mixer and mixed at high speed for 6 minutes. The processing oil needed to formulate the batch was pumped into the mixer over a period of 12-18 minutes with high speed agitation. After completion of the processing oil addition a 6 minute high speed mix period was used to complete the distribution of the processing oil uniformly throughout the mixture.

TABLE IV

Formulations

| | Example | | |
|---|---|---|---|
| Ingredient | 10 | 11 | 12 |
| UHMWPE (1), kg | 24.04 | 17.24 | 17.24 |
| HDPE (2), kg | 0.00 | 6.80 | 6.80 |
| Precipitated Silica (3), kg | 59.87 | 59.87 | 59.87 |
| Lubricant (4), g | 300.0 | 300.0 | 600.0 |
| Antioxidant | | | |
| (5) g | 300.0 | 300.0 | 0.0 |
| (6) g | 0.0 | 0.0 | 100.0 |
| Processing Oil (7), kg | | | |
| in Batch | 91.63 | 91.63 | 91.63 |
| at Extruder | ~35.14 | ~35.14 | ~35.14 |

(1) UHMWPE = Ultrahigh Molecular Weight Polyethylene, Himont 1900, Himont, U.S.A., Inc.
(2) HDPE = High Density Polyethylene, Hostalen ™ GM 6255, Hoechst Celanese Corp.
(3) HiSil ® SBG, PPG Industries, Inc.
(4) Petrac ® CZ81, Desoto, Inc., Chemical Speciality Division
(5) Irganox ® B-215, Ciba-Geigy Corp.
(6) Irganox ® 1010, Ciba-Geigy Corp.
(7) Shellflex ® 371, Shell Chemical Co.

The batch was then processed according to the general procedures described in respect of Examples 1-9 to form microporous sheets.

The microporous sheets were tested for various physical properties. Table II identifies the properties with the methods used for their determination. The results of physical testing of the microporous sheets are shown in Table V. The abbreviations MD and TD have the same meanings previously discussed.

TABLE V

Physical Properties of Microporous Sheet

| | Example No. | | |
|---|---|---|---|
| | 10 | 11 | 12 |
| Thickness, mm | 0.267 | 0.254 | 0.255 |
| Strip Tensile Strength, kN/m | | | |
| MD | 3.42 | | |
| TD | 1.52 | | |
| Breaking Factor, kN/m | | | |
| MD | | 3.44 | 3.23 |
| TD | | 1.42 | 1.52 |
| Elongation at break, % | | | |
| MD | 391 | 477 | 688 |
| TD | 448 | 451 | 704 |
| Processing Oil Content, wt % | 2.8 | 3.3 | 3.1 |

EXAMPLE 13

Sterilizable packages, each containing a simulated medical device were fabricated by heat sealing poly(ethylene terephthalate)/polyethylene coextruded film to the microporous material of Example 8 around the edge portions of the packages. The simulated medical devices consisted of poly(vinyl chloride) tubing having an outside diameter of about 4.19 millimeters, an inside diameter of about 3.18 millimeters, and a length of about 5 centimeters. The square packages had sides of about 7.6 centimeters. The heat sealed regions extended inwardly about 6 millimeters from all four edges of each package. The polyethylene side of the coextruded film faced the interior of each package and was adjacent the microporous material in the heat sealed regions.

EXAMPLE 14

Sterilizable packages were fabricated as in Example 13, except that the microporous material used was the microporous material of Example 9.

EXAMPLE 15

Sterilizable packages, each containing a simulated medical device, were fabricated by heat sealing a coextruded film of poly(ethylene terephthalate) and polyethylene to microporous material around the edge portions of the packages. The microporous material used was taken from a different roll of microporous material produced during the same production run as the microporous material of Example 8. The simulated medical devices consisted of poly(vinyl chloride) tubing having an outside diameter of about 6.35 millimeters, an inside diameter of about 4.76 millimeters, and a length of about 37 centimeters. The rectangular packages were about 22.5 centimeters in length and about 10.2 centimeters in width. The heat sealed regions extended inwardly about 8 millimeters from all four edges of each package. The polyethylene side of the coextruded film faced the interior of each package and was adjacent the microporous material in the heat sealed regions.

EXAMPLE 16

Contaminated membranes were formed by applying a suspension of spores of Bacillus subtilis subsp. niger to one side of 47 millimeter diameter hydrophobic edged discs of microporous membrane having pores of about 0.45 micrometer diameter. Each contaminated membrane contained about 1,500,000 spores.

Recovery plates were prepared from Soybean Casein Digest Agar (TSA). Approximately 25 milliliters of agar were poured per plate. The plates were dried with the lids half off under a laminar flow bench (2.8 cubic meters of air per minute) for 60 minutes. This resulted in a weight loss of approximately 2 grams per plate.

A series of 68 millimeter diameter discs was cut from the microporous material of Example 8 (Set A) and a series of discs of the same diameter was cut from the microporous material of Example 9 (Set B).

A 1.0 millimeter thick poly(tetrafluoroethylene) template was used as a pattern to place five holes in a portion of the discs of each set. The holes were located at the points of a pentagon bound by a 25 millimeter diameter circle. The holes were made in the microporous membrane discs with sparks from a Tesla coil. The average hole size for the perforated discs of Set A was 62 micrometers, while that for the perforated discs of Set B was 64 micrometers. The perforated microporous membrane discs served as positive controls.

A portion of the discs of each set, both perforated and unperforated, was sterilized by exposure for 2 minutes to ultraviolet light (UV) of 254 nanometer wavelength at an intensity of approximately 3500 microwatts per square centimeter.

The remainder of the discs of each set, both perforated and unperforated, was placed for a minimum of 8 hours in a preconditioning room at a temperature of about 38° C. and a relative humidity of about 60 percent.

An industrial-sized ethylene oxide sterilizer was brought to a temperature of about 49° C. The preconditioned discs, together with other items to be sterilized, were placed in the sterilizer. The sterilizer was sealed and the pressure was reduced to from 50.8 to 57.6 kilopascals below ambient atmospheric pressure while the temperature was returned to about 49° C. The pressure was then raised with steam to provide a humidity of 60±20 percent. The humidity dwell time at these conditions was from 60 to 90 minutes. Over a period of at least 20 minutes the pressure was raised to from 82.7 to 103.4 kilopascals above ambient atmospheric pressure using a gas mixture consisting of 12 percent by weight ethylene oxide and 88 percent by weight dichlorodifluoromethane. The ethylene oxide exposure dwell time at these conditions was from 6 to 8 hours. The pressure was then reduced to from 16.9 to 23.7 kilopascals below ambient atmospheric pressure. The pressure was returned to ambient atmospheric pressure using filtered air. The sterilizer was flushed with filtered air before removing the sterilized discs.

Individual sterilized discs of each set, some sterilized by UV and some sterilized by ethylene oxide, were each placed on the agar surface of a separate recovery plate. The contaminated side of a contaminated membrane was placed in contact with the sterilized disc. A 42 millimeter diameter absorbent pad was placed on top of the contaminated membrane. One and one-half milliliters of sterile water containing 0.1 percent by weight Tween 80 surfactant was added to the pad. The assembly thus formed was allowed to stand for 30 minutes, after which the disc, contaminated membrane, and pad were removed. Five replicates and one positive control were run for the discs of each set and each sterilization procedure.

The exposed recovery plates were incubated at 33° C. to 37° C. for 24 hours. The plates were then examined for the number of colony forming units (CFU's) of the organism present. The results are shown in Table VI.

TABLE VI

| Set | Sterilization Procedure | Number of CFU's Observed Replicate | | | | | Positive Control |
|---|---|---|---|---|---|---|---|
| | | 1 | 2 | 3 | 4 | 5 | |
| A | UV | 0 | 0 | 0 | 0 | 0 | 4 |
| A | Ethylene Oxide | 0 | 0 | 0 | 0 | 0 | 1 |
| B | UV | 0 | 0 | 0 | 0 | 0 | 4 |
| B | Ethylene Oxide | 0 | 0 | 0 | 0 | 0 | 6 |

EXAMPLE 17

A series of 47 millimeter diameter discs was cut from the microporous material of Example 8 (Set A) and a series of discs of the same diameter was cut from the microporous material of Example 9 (Set B). None of the discs of either set was intentionally perforated.

A portion of the discs of each set was sterilized by exposure to ultraviolet light (UV) as in Example 16.

The remainder of the discs of each set was preconditioned and sterilized by exposure to ethylene oxide as in Example 16.

An apparatus and procedure for evaluating the microbial barrier property of microporous materials is described in R. R. Reich, "Packaging Films: A Method of Microbial Barrier Evaluation", *Medical Device & Diagnostic Industry*, Feb. 1986, pages 19–21, the disclosure of which is in its entirety incorporated herein by reference. The apparatus and general procedure of the Reich paper were used to quantitatively evaluate the microbial barrier property of the sterilized discs. Deviations from the general procedure of the paper are described below.

In each run the chamber was operated using one positive control and five discs of the same set and sterilization procedure. Each of the five discs was mounted in a separate filter unit with a sterile 0.45 micrometer bacteria-retentive membrane positioned beneath the disc and the upper surface of the membrane facing the disc. For the positive control, the sixth filter unit was operated as an open filter unit. This open filter unit contained a sterile 0.45 micrometer bacteria-retentive membrane placed above a disc of the same set and sterilization procedure as the five test discs. The upper surface of the membrane of the open filter unit faced the bacterial challenge. The sample area exposed to the bacterial challenge per filter unit was 13.2 square centimeters.

A suspension of *Bacillus subtilis* spores was atomized into the chamber through a Model 645 DeVilbiss nebulizer to provide a bacterial challenge level in the chamber of approximately 40,000 *Bacillus subtilis* spores per cubic meter. Filtered air pressure to the nebulizer was controlled at about 34.5 kilopascals, gauge. An internal circulating fan operating at 0.71 cubic meter per minute insured a homogenous chamber distribution of organisms. The pressure differential across the filter units was maintained such as would provide an air flow rate of about 250 cubic centimeters per minute per filter unit. The exposure time per run was 30 minutes. One run was made for discs of the same set and sterilization procedure.

After each run, the lower surfaces of the five 0.45 micrometer bacterial-retentive membranes which had been positioned below the test discs and the lower surface of the 0.45 micrometer bacteria retentive membrane of the positive control were each placed on the agar surface of a separate recovery plate. The resulting membrane-recovery plate assemblies were incubated at 33° C. to 37° C. for 24 hours. The upper surfaces of the membranes were then examined for the number of colony forming unit (CFU's) of the organism present. The results are shown in Table VII.

TABLE VII

| Set | Sterilization Procedure | Replicate | | | | | Positive Control |
|---|---|---|---|---|---|---|---|
| | | 1 | 2 | 3 | 4 | 5 | |
| A | UV | 0 | 0 | 0 | 0 | 0 | 160 |
| A | Ethylene Oxide | 0 | 0 | 0 | 0 | 0 | 190 |
| B | UV | 0 | 0 | 0 | 0 | 0 | 120 |
| B | Ethylene Oxide | 0 | 0 | 0 | 0 | 0 | 194 |

In the Standard Ethylene Oxide Exposure Sequence employed in the Examples which follow, the ambient atmospheric pressure was measured and the empty chamber of a biological indicator evaluator resistometer (BIER) unit manufactured by the Joslyn Valve Corporation, Macedon, N.Y., was flushed to insure removal of any ethylene oxide or moisture by twice reducing the pressure to 88.0 kilopascals below ambient atmospheric pressure and breaking the vacuum with filtered air. The temperature of the chamber was brought to 54.4° C. and the appropriate number of sterilizable packages were placed in the chamber. In order to bring the packages to 54.4° C., they were allowed to stand in the chamber for a temperature dwell time which is specified in the Examples. The chamber pressure was reduced to 88.0 kilopascals below ambient atmospheric Pressure and the absolute pressure was recorded. The pressure was then raised with steam to provide a calculated relative humidity of 50 percent (the absolute pressure was generally in the range of from about 16 to about 19 kilopascals, the particular value depending upon the absolute pressure before steam introduction). The dwell time at these conditions, viz., the humidity dwell time, is specified in the Examples. The pressure was then raised with a gas mixture consisting of 12.1 percent by weight ethylene oxide and 87.9 percent by weight dichlorodifluoromethane to provide a calculated ethylene oxide concentration of 600 milligrams of ethylene oxide per liter of chamber gas at 54.4° C. and the chamber pressure. The ethylene oxide exposure dwell time under these conditions is specified in the Examples. The pressure was then reduced to 88.0 kilopascals below ambient atmospheric pressure, raised to ambient atmospheric using filtered air and reduced to 88.0 kilopascals below ambient atmospheric pressure. The pressure was then returned to ambient atmospheric pressure using filtered air and the chamber was flushed with filtered air for about 5 minutes before removing the sterilized packages.

EXAMPLE 18

Biological indicator strips were assayed and found to contain 2,400,000 spores of *Bacillus subtilis* subsp. niger per strip.

Fifty sterilizable packages (Set A) were fabricated as in Example 13, except that a biological indicator strip was sealed inside each package instead of a simulated medical device.

Fifty sterilizable packages (Set B) were fabricated as in Example 14, except that a biological indicator strip was sealed inside each package instead of a simulated medical device.

The one hundred packages were arranged in five groups such that each group contained ten packages from each set. Each group of packages, together with unpackaged biological indicator strips as controls, was sterilized with ethylene oxide using the Standard Ethylene Oxide Exposure Sequence and the following parameters:

Temperature Dwell Time: 5 minutes
Humidity Dwell Time: 10 minutes
The Ethylene Oxide Dwell Time differed from group to group.

Within 30 to 60 minutes of completion of the Standard Ethylene Oxide Exposure Sequence, the biological indicator strips removed from the packages and the controls were aseptically transferred to containers of Trypticase Soy Broth (Soybean Casein Digest Medium, USP.) The containers were incubated at 32° C. to 37° C.

and observed daily for seven days for evidence of growth.

Decimal reduction values (D-values) were calculated using the most probable number of fraction negative procedure of Stumbo, Murphy, and Cochran, *Food Technology*, volume 4, pages 321-326 (1950), the entire disclosure of which is incorporated herein by reference. The D-value is defined as the sterilant exposure time to reduce a microbial population by 90 percent under the conditions of the test. When the population is reduced by 90 percent, the surviving population is one-tenth of the population before reduction. The D-values were calculated from the equation:

$$D = \frac{T}{\log N_o - \log N_t}$$

where:
D is the D-value
T is the Ethylene Oxide Dwell Time
$N_o$ is the initial indicator organism population
$N_t$ is the indicator organism population at time T which is equal to ln (r/q)
r is the number of samples
q is the number of sterile samples
ln is the natural logarithm
log is the logarithm to the base 10.

The Ethylene Oxide Dwell Times and results are shown in Table VIII.

TABLE VIII

| T. minutes | Set A | | Set B | |
|---|---|---|---|---|
| | r/q | D, minutes | r/q | D, minutes |
| 23 | 10/0 | — | 10/0 | — |
| 29 | 10/0 | — | 10/0 | — |
| 30 | 10/4 | 4.7 | 10/8 | 4.3 |
| 32 | 10/10 | — | 10/10 | — |
| 32 | 10/8 | 4.6 | 10/10 | — |

EXAMPLE 19

Biological indicator strips were assayed and found to contain 2,300,000 spores of *Bacillus subtilis* subsp. *niger* per strip.

Forty sterilizable packages (Set A) were fabricated as in Example 14 except that a biological indicator strip was sealed inside each package instead of a simulated medical device.

Forty sterilizable packages (Set B) were fabricated as in Example 13 except that the microporous material described in Example 15 was used and a biological indicator strip was sealed inside each package instead of a simulated medical device.

The eighty packages were arranged in four groups such that each group contained ten packages from each set. Each group of packages, together with ten unpackaged biological indicator strips as controls, was sterilized with ethylene oxide in accordance with the procedure of Example 18. The biological indicator strips were assayed and D-values were calculated in accordance with the procedure of Example 18. The Ethylene Oxide Dwell Times and the results are shown in Table IX.

TABLE IX

| T, minutes | Set A | | Set B | | Control | |
|---|---|---|---|---|---|---|
| | r/q | D, minutes | r/q | D, minutes | r/q | D, minutes |
| 23 | 10/0 | — | 10/0 | — | 10/0 | — |
| 27 | 10/1 | 4.5 | 10/6 | 4.1 | 10/7 | 4.0 |
| 30 | 10/9 | 4.1 | 10/8 | 4.3 | 10/8 | 4.3 |
| 35 | 10/10 | — | 10/10 | — | NC* | NC* |

*NC = Not Conducted

EXAMPLE 20

Five of the sterilizable packages of Example 13 (Set A) and five of the sterilizable packages of Example 14 (set B) were preconditioned for about 68 hours in an aeration room at about 38° C. and 50 percent relative humidity. Both preconditioned sets of packages were sterilized together with ethylene oxide using the Standard Ethylene Oxide Exposure Sequence and the following parameters:

Temperature Dwell Time: 1 minute
Humidity Dwell Time: 30 minutes
Ethylene Oxide Dwell Time: 240 minuites Upon completion of sterilization, the sterilized packages were quarantined in a post processing aeration area at ambient temperature and pressure.

Soon after sterilization and thereafter at daily intervals, a sterilized package from each set was separately extracted with acetone for 24 hours at ambient temperature based on the procedure as outlined in the Association for the Advancement of Medical Instrumentation (AAMI) draft document entitled "Recommended practice for the Determination of Ethylene Oxide Residuals" (June 1986) and the Health Industry Manufacturers Association (HIMA) monograph entitled "Guidelines for the Analysis of Ethylene Oxide Residuals in Medical Devices" (January 1980), the disclosures of both of which are, in their entireties, incorporated herein by reference.

Three individual curves were constructed from the analyses of solutions having known concentrations of ethylene oxide in acetone using a gas chromatograph equipped with a flame ionization detector. The responses were recorded as chromatogram peak areas versus ethylene oxide concentraion. The data from the three curves were collated and a line of best fit was generated through the mean data points by linear regression analysis to provide a standard response curve.

The liquid extracts were analyzed in duplicate using the same gas chromatograph. The mean peak area per sample was compared to the standard response curve to determine the micrograms of ethylene oxide per milliliter of extract. This value was multiplied by the total extract volume expressed in milliliters and then the product was divided by the weight of the extract expressed in grams to provide the ethylene oxide concentration as parts by weight of ethylene oxide per million parts by weight of extract (ppm). The results are shown in Table X.

TABLE X

| | Ethylene Oxide Concentration In Extract, ppm | |
|---|---|---|
| Aeration Time, Days | Set A | Set B |
| 0 | 9647 | 9558 |
| 1 | 774 | 844 |
| 2 | 104 | 39 |
| 3 | <10* | <10* |

TABLE X-continued

| | Ethylene Oxide Concentration In Extract, ppm | |
|---|---|---|
| Aeration Time, Days | Set A | Set B |
| 4 | <10* | <10* |

*No peak detected.

Although the present invention has been described with reference to specific details of certain embodiments thereof, it is not intended that such details should be regarded as limitations upon the scope of the invention except insofar as they are included in the accompanying claims.

I claim:

1. In a package, which when sealed and sterilized in a sterilizing environment before or after sealing maintains the interior of said package in a bacteria-free condition after removal of said package from said sterilizing environment, said package comprising at least one unstretched microporous member which is impermeable to the passage of bacteria and which is permeable to the passage of gases between the exterior and interior of said package, the improvement wherein said microporous member comprises:

(a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof.

(b) finely divided particulate substantially water-insoluble siliceous filler distributed throughout said matrix, said filler constituting from about 50 percent to about 90 percent by weight of said microporous member, and (c) a network of interconnecting pores communicating throughout said microporous member, said pores constituting from about 35 to about 80 percent by volume of said microporous member.

2. The package of claim 1 wherein said essentially linear ultrahigh molecular weight polyolefin is essentially linear ultrahigh molecular weight polyethylene having an intrinsic viscosity of at least about 18 deciliters/gram.

3. The package of claim 2 wherein high density polyethylene is present in said matrix in an amount that does not materially affect the properties of the microporous material in an adverse manner.

4. The package of claim 2 wherein said ultrahigh molecular weight polyethylene has an intrinsic viscosity in the range of from about 18 to about 39 deciliters/gram.

5. The package of claim 2 wherein said filler constitutes from about 50 percent to about 85 percent by weight of said microporous member.

6. The package of claim 2 wherein said filler is silica.

7. The package of claim 2 wherein said filler is precipitated silica.

8. The package of claim 7 wherein said precipitated silica has an average ultimate particle size of less than about 0.1 micrometer.

9. The package of claim 2 wherein the volume average diameter of said pores as determined by mercury porosimetry is in the range of from about 0.02 to about 0.5 micrometers.

10. The package of claim 2 wherein said pores constitute from at least about 60 percent to about 75 percent by volume of said microporous member.

11. The package of claim 2 wherein said microporous material has a thickness in the range of from about 0.03 to about 0.65 millimeter.

12. The package of claim 2 which also comprises at least one material which is impervious to the passage of gas and bacteria.

13. The package of claim 12 wherein said material is polyethylene, polypropylene, poly(vinyl chloride), saran, poly(ethylene terephthalate) or aluminized poly(ethylene terephthalate), in the form of film or sheet, or aluminum foil.

14. The package of claim 12 comprising at least one seam, joint or seal where a portion of said member and a portion of said material have been heat sealed together.

15. The package of claim 12 comprising at least one seam, joint, or seal wherein a portion of said member and a portion of said material have been adhesively bonded together.

16. The package of claim 12 comprising at least one peelable seal.

* * * * *